US006617971B2

(12) United States Patent
Keller

(10) Patent No.: US 6,617,971 B2
(45) Date of Patent: Sep. 9, 2003

(54) BATTERY OPERATED TEMPERATURE WARNING SENSOR

(76) Inventor: John Keller, 409 N. Anderson St., Bismarck, ND (US) 58501

( * ) Notice: Subject to any disclaimer, the term of this patent is extended or adjusted under 35 U.S.C. 154(b) by 0 days.

(21) Appl. No.: 09/966,569

(22) Filed: Sep. 26, 2001

(65) Prior Publication Data

US 2003/0058115 A1 Mar. 27, 2003

(51) Int. Cl.[7] .............................................. G08B 17/00
(52) U.S. Cl. ...................... 340/584; 340/586; 340/449; 340/688; 374/200; 374/188; 337/334
(58) Field of Search ................. 340/584, 585, 340/586, 594, 449, 688; 337/298, 333, 376, 3, 334; 374/200, 208, 205, 209, 163, 204, 210, 188; 116/102, 101, 103; 200/56 R

(56) References Cited

U.S. PATENT DOCUMENTS

| | | | | |
|---|---|---|---|---|
| 489,259 A | * | 1/1893 | Maxim et al. ............... | 337/309 |
| 2,523,352 A | * | 9/1950 | Behr ........................... | 200/318 |
| 3,656,138 A | * | 4/1972 | Hamma ................ | 128/DIG. 13 |
| 3,888,121 A | * | 6/1975 | Geldmacher ................... | 374/1 |
| 3,952,692 A | | 4/1976 | Griggs ......................... | 116/102 |
| 4,016,536 A | * | 4/1977 | La Chapelle ............ | 200/61.41 |
| 4,233,750 A | | 11/1980 | Cheng ......................... | 337/374 |
| 4,396,301 A | * | 8/1983 | Stucki ......................... | 337/205 |
| 4,612,537 A | | 9/1986 | Maltais et al. .............. | 340/596 |
| 4,969,508 A | | 11/1990 | Tate et al. ................... | 165/209 |
| 5,169,236 A | | 12/1992 | Iest ............................. | 374/156 |
| 5,917,416 A | | 6/1999 | Read .......................... | 340/584 |
| 5,973,602 A | | 10/1999 | Cole, III et al. ............ | 340/584 |
| 6,034,607 A | | 3/2000 | Vidaillac ..................... | 340/585 |
| 6,053,633 A | | 4/2000 | Bilenker ..................... | 374/156 |

* cited by examiner

Primary Examiner—Benjamin C. Lee
(74) Attorney, Agent, or Firm—TraskBritt

(57) ABSTRACT

An alarm device for signaling when an object reaches a specified temperature. The alarm device includes a thermometer for detecting the temperature of the object. The device further includes a switch element which is closed when the thermometer indicates the specified temperature. The closed switch element triggers an alarm, such as a light or a buzzer, which will signal a person monitoring the temperature that the specified temperature has been reached.

14 Claims, 3 Drawing Sheets

BATTERY OPERATED TEMPERATURE WARNING SENSOR

FIELD OF THE INVENTION

The present invention relates to temperature sensing devices. In particular, the present invention relates to a thermometer that activates a warning signal when a specified temperature is reached. More particularly, the present invention relates to a thermometer with a needle, where the needle activates a warning signal, such as a light or horn, when a specified temperature is reached.

BACKGROUND OF THE INVENTION

Temperature sensing devices are well known and widely used in many industrial and consumer applications. Temperature sensing is important for many industries, including food production, where the food can spoil if the proper temperature is not maintained. Cooks can also use a temperature sensing device to monitor the temperature of a grill, other cooking device, or food being cooked. Temperature sensing is also important in industries that use motors and other types of mechanical machinery because high temperatures which may be generated by these devices can shorten the life of the devices or cause a fire if the high temperature goes undetected. Temperature sensing devices are also utilized in scientific experiments that require the monitoring of the temperature.

The prior art discloses many temperature sensing devices where a user can simply look at the device to check the temperature. For example, a simple thermometer can be used. However, these devices are inefficient to use because they require constant monitoring. If a user becomes preoccupied with another task, the temperature can rise undetected and cause damage before the elevated temperature is noticed by the user. The prior art also discloses more complex temperature sensing devices where some sort of warning signal is emitted. In one example, a plurality of temperature sensors is placed in various locations in an industrial plant. The temperature sensors are hard wired to a centralized monitoring system where the temperature is monitored. However, the hard wiring of the temperature sensors makes the system susceptible to damage from routine maintenance in the plant because a wire could be damaged during the maintenance.

A temperature sensing device that is durable, contains no external components that can be damaged, is inexpensive to manufacture, is portable, and emits a warning signal that is readily detectable would thus be an improvement in the art.

SUMMARY OF THE INVENTION

The present invention is directed to an alarm device configured to detect when an object reaches a specified target temperature. In one embodiment of the invention, a movable element in the form of a needle from a dial-type thermometer physically contacts two contact points of a switch element, thus completing an electric circuit. The closed circuit allows electricity from a power source such as a battery to activate a warning signal device. The activated warning signal device, such as a light or buzzer, thus can alert a person monitoring the temperature that the target temperature has been reached.

DETAILED DESCRIPTION OF THE INVENTION

The present invention provides an inexpensive and efficient temperature monitoring device that may be used to monitor the temperature of a variety of objects. Using a dial-type thermometer with a needle, the present invention can warn users when an object reaches a specified target temperature.

As used herein, the term "dial-type thermometer" refers to a thermometer wherein the temperature is displayed on a circularly shaped face. The face displays a plurality of temperatures that corresponds to a range of temperatures to be sensed by the thermometer. Typically, the temperature on the face is indicated by the position of a needle relative to the displayed temperatures.

As used herein, the term "on" refers to the concept that the circuit contained in the present invention is closed. The closed circuit allows electricity to travel across the circuit.

As used herein, the term "off" refers to the concept that the circuit contained in the present invention is open. The open circuit prevents electricity from traveling across the circuit.

As used herein, the term "warning device" refers to a device that emits some sort of signal. The signal may be in the form of audio waves or sound, light energy, visually perceptive movement, or any type of signal that may be detected by human senses.

As used herein, the term "conventional circuitry" refers to an electrical circuit well known by those skilled in the art. The term is meant to encompass the components of electrical circuits that carry electricity.

Figure 1:
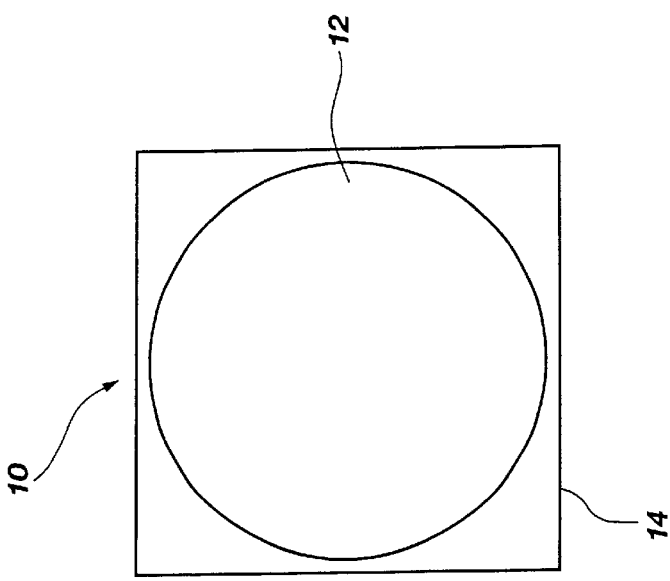
FIG. 1 is a top view of the illustrated embodiment of the present invention.

Referring to FIG. 1, there is shown a top view of the illustrated embodiment of the alarm device generally at 10. The alarm device 10 comprises a cap 12 made of a translucent material, such as clear plastic, so that when the warning signal, such as a light, is on, the user will be able to detect the light through the cap 12. It will be appreciated by those skilled in the art that the cap may also be made of a transparent material. The alarm device 10 also comprises a housing 14. The housing 14 can be made of any suitable material that will conceal and protect the components of the alarm device 10 such as metal, plastic or other material.

Figure 2A:
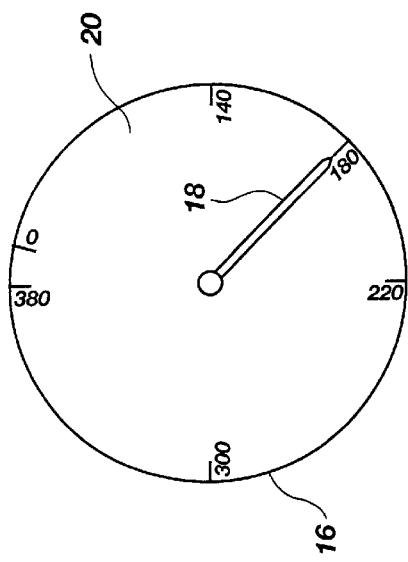
FIG. 2A is a top view of the dial thermometer used in the device shown in FIG. 1.

Referring now to FIG. 2A, there is shown a thermometer 16 used in the alarm device 10. In the illustrated embodiment, the thermometer 16 is a dial-type thermometer 16. The thermometer 16 comprises a needle 18. In the illustrated embodiment, the needle 18 is electrically conductive. It will be appreciated by those skilled in the art that the needle 18 can be made electrically conductive by manufacturing the needle 18 with an electrically conductive material, such as a conductive metal or alloy, or by coating the needle 18 with an electrically conductive material. The needle 18 may be insulated from the rest of the thermometer 16, in a manner known by those of ordinary skill in the art, to prevent the electricity from flowing through the thermometer 16. In one example, the needle 18 may be made of a nonconductive material, such as plastic, and coated with a conductive material such that the portion of the needle 18 coated with the conductive material transmits electricity. The thermometer 16 further comprises a face 20. In the illustrated embodiment, the face 20 of the thermometer 16 is marked with indicia of a temperature gradient that corresponds to the intended temperature range of the thermometer 16. It will be appreciated that dial-type thermometers are well known by those of ordinary skill in the art.

Figure 2B:
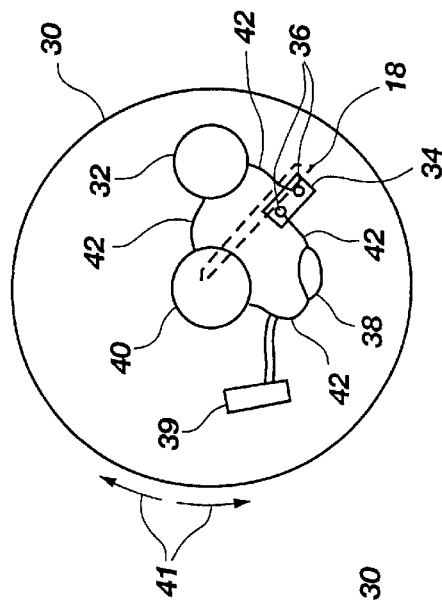
FIG. 2B is a top view of the circuit board used in the device shown in FIG. 1.

Referring now to FIG. 2B, there is shown a circuit board 30 of the alarm device 10 shown in FIG. 1. The circuit board 30 comprises a power source 32. The power source 32 in the illustrated embodiment is a low-voltage battery, such as the lithium-style, long life battery commonly used in many electrical devices, such as watches and flashlights. It will be appreciated by those of ordinary skill in the art that other power sources 32 can be used such as alkaline batteries, solar cells or other low-voltage power sources. The circuit board 30 also comprises a switch element 34. The switch element 34 comprises two conductive contact points 36, wherein the contact points 36 are separated from each other by the dielectric material of the circuit board 30, such that electricity does not flow from one contact point 36 to the other contact point 36.

Figure 2C:
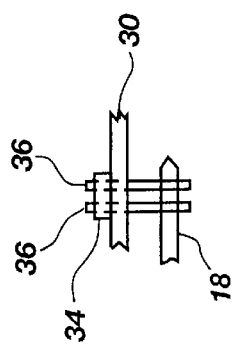
FIG. 2C is a partial side view of the circuit board shown in FIG. 2B.

Referring now to FIG.2C, there is shown a partial side view of the circuit board 30 of FIG. 2B showing the switch element 34. The contact points 36 extend below the surface of the circuit board 30. The extension of the contact points 36 below the circuit board 30 allows the electrically conductive needle 18 of the thermometer 16 to simultaneously physically touch the two contact points 36. In operation, the alarm device 10 of the present invention is typically "off" because the two contact points 36 of the switch element 34 are not contacted by the needle 18. When the electrically conductive needle 18 simultaneously touches both contact points 36, electricity travels from one contact point 36, through the electrically conductive needle 18, and to the other contact point 36. Thus, the switch comprising the switch element 34 and needle 18 is closed and the alarm device 10 is "on." When the alarm device 10 is "on," electric current flows through conventional circuit traces 42 in the alarm device 10 and causes a warning device 40 to emit a signal.

Referring back to FIG. 2B, the circuit board 30 also comprises a diode 38. The diode 38 may be a conventional diode or a light-emitting diode. It will be appreciated by those of ordinary skill in the art that when the power source 32 comprises a battery, the diode 38 may be omitted from the circuit board 30 because the battery provides DC current. The circuit board 30 also comprises an electronic warning device 40. In the illustrated embodiment, the warning device 40 is a lightbulb, but it will be appreciated by those skilled in the art that the electronic warning device 40 can be any type of device that emits a warning signal. Other types of warning devices 40 may include, but are not limited to, a horn or a buzzer, or any combination of warning devices. The power source 32, switch element 34, diode 38, and warning device 40 are interconnected by conventional circuit traces 42 well known by those of ordinary skill in the art. The conventional circuit traces 42 transmit current between the battery 32, the switch element 34, the diode 38, and the warning device 40.

In another embodiment, a manual switch in the form of a toggle switch 39 may be added to the conventional circuit traces 42. In this embodiment, the toggle switch 39 will have a lever (not shown) extending out of the exterior of the housing 14 such that when the specified temperature has been met and the alarm device 10 is "on", the lever (not shown) on the toggle switch 39 can be moved such that the conventional circuit traces 42 in the toggle switch 39 are open, thus turning the alarm device 10 "off." The addition of a toggle switch 39 thus allows a user to turn the alarm device 10 "off" when the functionality of the alarm device 10 is not needed.

Still referring to FIG. 2B, the circuit board 30 may be mounted for rotation inside of the housing 14 (not shown). Such rotational capability allows the entire circuit board 30 to be moved in either a clockwise or counterclockwise direction indicated by the arrows 41. The rotation of the circuit board 30 thus allows the position of the switch element 34 to be moved. The movement of the switch element 34 allows the predetermined temperature to be changed by the user. For example, rotation of the circuit board 30 in a counterclockwise direction allows the predetermined temperature to be lowered. Referring back to FIG. 2A, the circuit board 30 may be rotated such that the needle 18 contacts the switch element 34 (shown in FIG. 2B) at 140 degrees instead of 180 degrees. The rotational mounting of the circuit board 30 allows a user to rotate the circuit board 30 such that any specified target temperature within the range displayed on the face 20 may be set.

Figure 3:
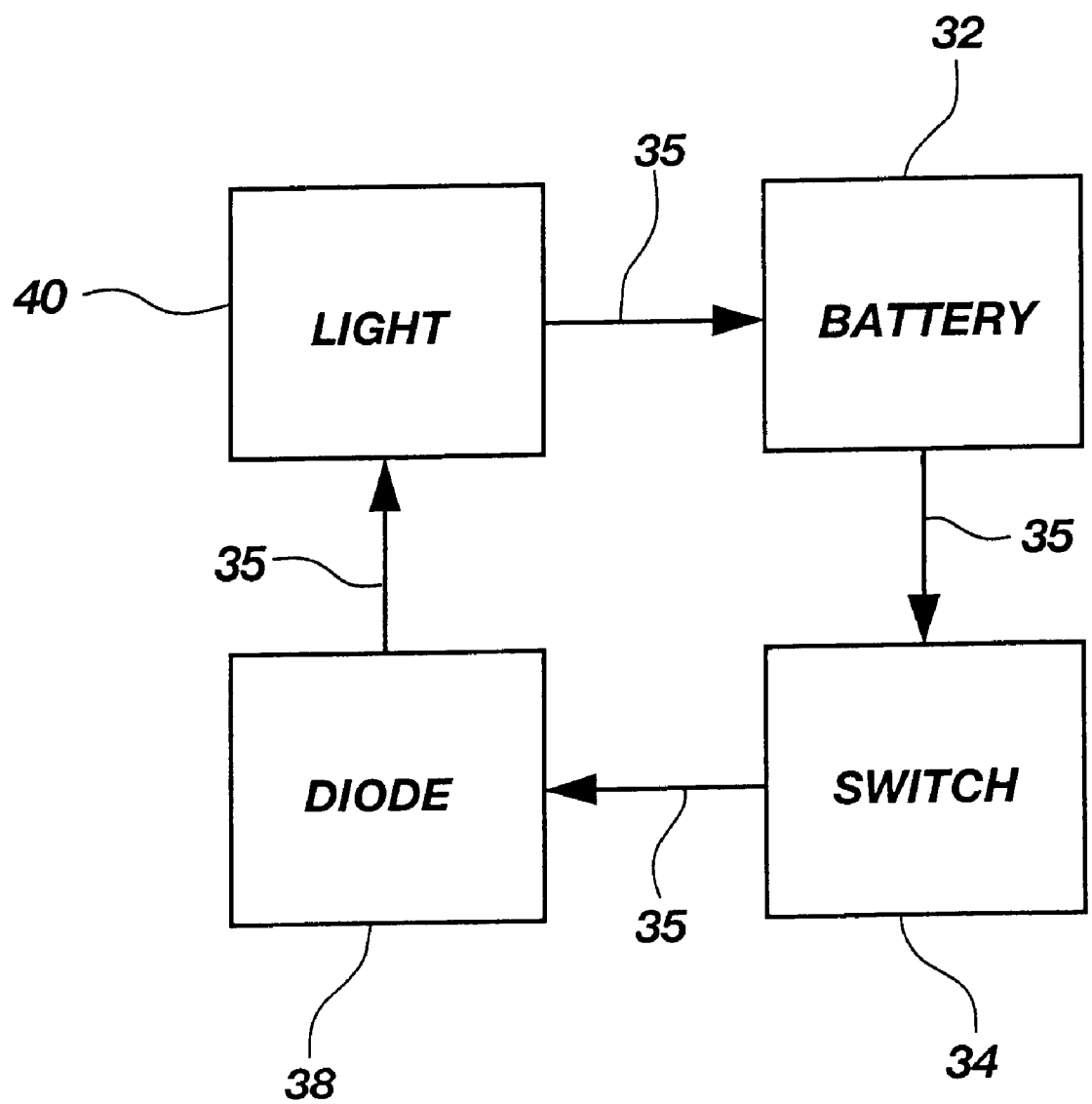
FIG. 3 is a functional block diagram which shows the pathway the electricity travels between the electrical components incorporated into the device of FIG. 1.

Referring now to FIG. 3, there is shown a functional block diagram which shows the flow of electricity between the electrical components incorporated into the alarm device 10 of the present invention. The power source 32 comprises a battery in this embodiment, but may also comprise a solar cell or an external power source. The power source 32 is connected to the switch element 34, such that when the switch element 34 is closed, electricity will flow from the power source 32 to the switch element 34 and from the switch element 34 to the diode 38. It is well known by those of ordinary skill in the art that the diode 38 restricts the flow of electricity to one direction as indicated by the arrows 35. The electricity will then flow from the diode 38 to the warning device 40, which in the illustrated embodiment is a light. The electricity will then flow from the warning device 40 back to the power source 32.

Figure 4:
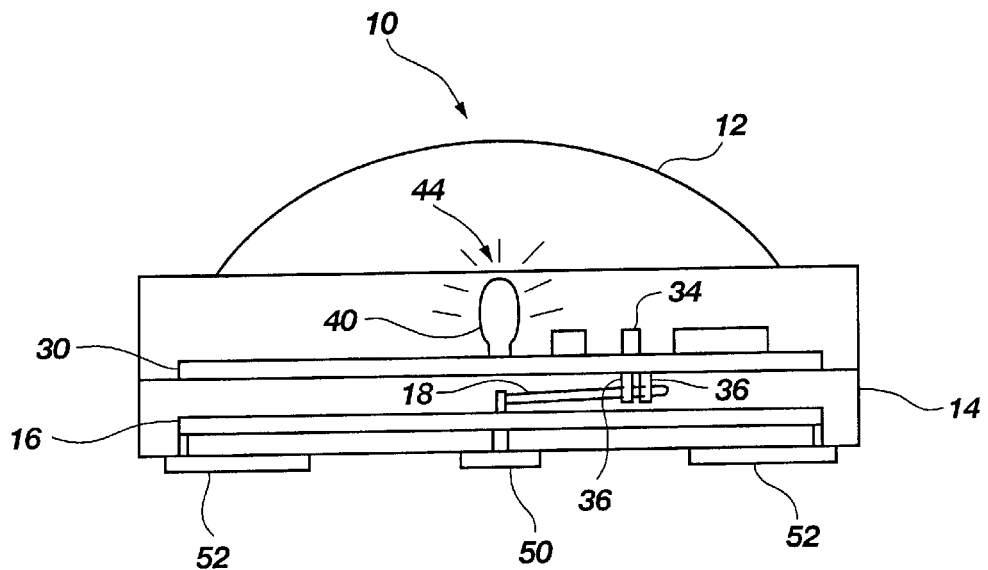
FIG. 4 is a side view of the illustrated embodiment of the device shown in FIG. 1.

Referring now to FIG. 4, there is shown a side view of the alarm device 10 shown in FIG. 1. The thermometer 16 and the circuit board 30 are shown located inside of the housing 14. In the illustrated embodiment, the cap 12 is raised such that when light 44 is given off by the warning device 40, the light 44 is refracted and thus may be detected by a user from the side of the alarm device 10, as well as from the top of the alarm device 10. The alarm device 10 is shown with the needle 18 touching the two contact points 36, such that the switch comprising the switch element 34 and needle 18 is closed and the alarm device 10 is "on." When the switch element 34 is closed, the warning device 40 emits a warning signal such as light, shown by lines 44. The side view also shows a temperature sensing device 50 such as a bimetallic spring. It will be appreciated by those of ordinary skill in the art that the temperature sensing device 50 is integral with the dial-type thermometer 16, such that the needle 18 on the thermometer 16 will be moved as the temperature detected by the temperature sensing device 50 changes. In the illustrated embodiment, the temperature sensing device 50 may include a heat sink to contact the surface of an object such that the temperature of the surface of the object is measured.

The illustrated embodiment further comprises a pair of magnets 52, wherein the magnets 52 are attached to the housing 14 of the alarm device 10. The magnets 52 may be used to magnetically attach the alarm device 10 to any ferrous surface, such that the temperature of the ferrous surface will be monitored.

It will be recognized by those of ordinary skill in the art that high temperatures may damage certain components of the alarm device 10. For example, high temperatures may cause damage to the power source 32 or the plastic used to construct the housing 14. These potential problems can be solved with alternative embodiments of the alarm device 10. In one embodiment, the alarm device 10 may be designed such that only the temperature sensing device 50, such as a heat sink, contacts the surface of the monitored object. In this embodiment, air circulation will help keep the rest of the alarm device 10 at ambient temperature. In another embodiment, the power source 32 may be thermally insulated from the monitored object such that the power source 32 is not subjected to high heat. These embodiments are only illustrative of ways to protect the components of the alarm device 10 from high heat. It will be appreciated by those of ordinary skill in the art that this invention is meant to cover other embodiments designed to protect the components of the warning device 10 from high heat.

It will be appreciated by those of ordinary skill in the art that the illustrated embodiment of the present invention may be used in many applications. For example, the alarm device 10 may be used in an industrial setting. Because the alarm device 10 is inexpensive, a plurality of alarm devices 10 may be attached to many pieces of equipment without imposing a large cost on the user. The alarm device 10 may be used to alert workers at an industrial plant when the temperature of the surface of a motor, pump, gearbox or any other piece of machinery exceeds a specified temperature. Because the alarm device 10 contains an independent power source 32, the alarm device 10 is portable and no external wiring is needed to connect the plurality of alarm devices 10.

The alarm device 10 of the present invention described with respect to the illustrated embodiment also has many consumer uses. For example, the alarm device 10 may be used by outdoor grilling enthusiasts. The alarm device 10 may be placed on a grill hood or cover and used to alert the cook that a target temperature has been reached and that it is time to start cooking. It will be appreciated by those of ordinary skill in the art that this is just one example of a consumer use and that many other uses exist.

Figure 5:
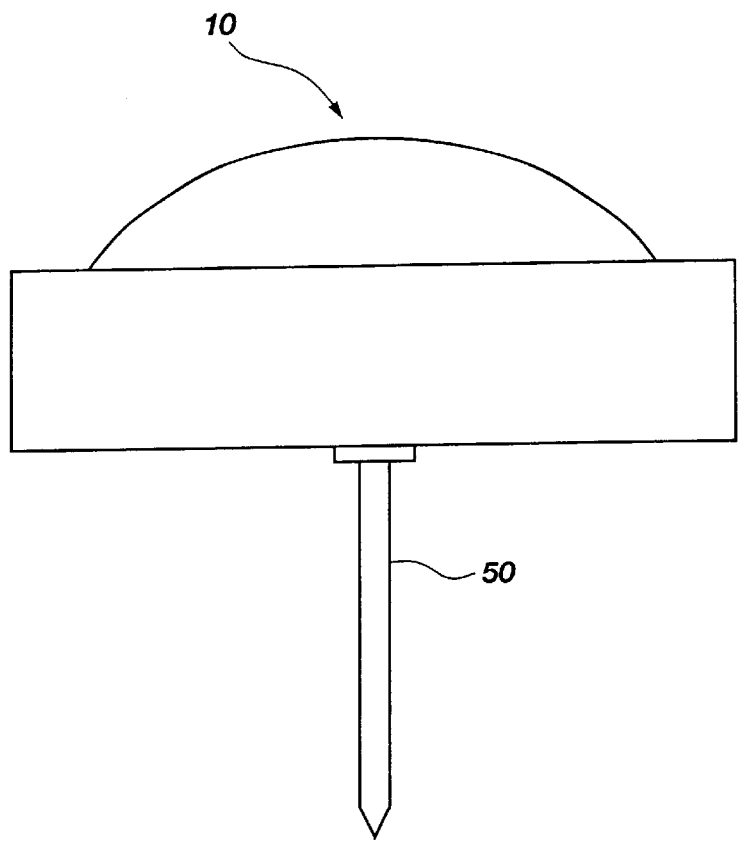
FIG. 5 is a side view of an alternative embodiment of the present invention.

The temperature sensing device 50 could also be configured in many other ways known by those skilled in the art for a variety of uses. Referring to FIG. 5, there is shown a side view of an alternative embodiment of the present invention. In this embodiment, the temperature sensing means 50 is configured with a heat sink usable as a probe. It will be appreciated by those of ordinary skill in the art that the probe in this embodiment has a wide variety of uses. For example, the probe could be used to sense the temperature of liquids, foods such as brats, hamburgers, hot dogs, fish, chicken or any other material in which the probe may be inserted. This embodiment may be useful to grilling enthusiasts to ensure that the interior of the meat being cooked has reached a temperature sufficient to ensure that the meat is thoroughly cooked. It will be appreciated by those of ordinary skill in the art that the temperature sensing device 50, such as the probe, may be connected to the alarm device 10 in a manner such that the alarm device 10 is located remote from the temperature sensing device 50. This embodiment allows the temperature sensing device 50 to be inserted into the object to be measured such that the alarm device 10 is not subjected to the high heat of the object being measured.

The embodiments described herein do not limit the scope of the present invention. In each of its various embodiments, the apparatus and methods of the present invention provides an inexpensive and efficient alarm device for monitoring the temperature of an object, and the present invention may be carried out using embodiments different from those specifically described herein. Therefore, the scope of the present invention is not limited by the description provided by the present specification, but is defined by the appended claims.

What is claimed is:

1. A temperature sensing device, comprising:
a thermometer, comprising a temperature sensor and a rotatable elongate element for indicating a sensed temperature, wherein said rotatable elongate element for indicating the sensed temperature is rotatable by the temperature sensor responsive to a change in temperature, wherein at least a portion of said rotatable elongate element is electrically conductive;
a circuit connecting an electrical power source, a switch element and an electronic warning device, wherein the switch element is positioned in relation to the rotatable elongate element such that when a selected temperature is sensed by the temperature sensor, said rotatable elongate element for indicating the sensed temperature physically contacts said switch element allowing an electrical current from the power source to pass through said rotatable elongate element;
wherein said switch element is configured for rotation to adjust the selected temperature at which said rotatable elongate element will contact said switch element, and
wherein the electronic warning device is configured to emit a signal when connected to the power source.

2. The device of claim 1, wherein said switch element comprises at least two contact points, wherein said at least two contact points are positioned such that when said rotatable elongate element for indicating the sensed temperature reaches a selected, sensed temperature, said rotatable elongate element simultaneously contacts said at least two contact points to complete the circuit.

3. The device of claim 2, wherein said rotatable elongate element for indicating the sensed temperature comprises an electrically conductive needle.

4. The device of claim 1, further comprising at least one magnet for attaching said temperature sensing device to a ferrous surface.

5. The device of claim 1, wherein said power source is a battery.

6. The device of claim 1, wherein said electronic warning device is at least one of a light, a buzzer, a bell or a horn.

7. The device of claim 6, further comprising a diode, wherein said diode is connected within the circuit.

8. The device of claim 2, further comprising a manual switch connected in the circuit.

9. The device of claim 3, wherein the temperature sensor of the thermometer includes a probe.

10. The device of claim 1, wherein the power source is thermally insulated to protect the power source from heat.

11. The device of claim 1, wherein the thermometer is configured such that the temperature sensor is located at a position remote to the circuit, the electrical power source, the switch element and the electronic warning device.

12. The device of claim 7, wherein the diode comprises a light-emitting diode.

13. A battery operated temperature warning device for indicating when a specified temperature is reached, comprising:

a dial-type thermometer, wherein said thermometer comprises an electrically conductive needle for indicating a temperature, wherein said thermometer is configured to move said needle rotationally in response to a change in temperature;

a battery;

a switch element, wherein said switch element comprises at least one contact point, wherein said at least one contact point is positioned in a location relative to the needle such that when said specified temperature is reached, the needle of said thermometer comes in physical contact with said at least one contact point such that said physical contact closes said switch element;

wherein said switch element is configured for rotation to adjust the specified temperature at which said electrically conductive needle will contact said switch element;

an electronic warning device, wherein said electronic warning device is configured to emit a warning signal when the switch element is closed;

circuit traces, wherein said circuit traces connect the battery, the switch element, and the electronic warning device; and a housing, wherein said housing comprises a protective outer shell that encloses the thermometer, the battery, the switch element, the electronic warning device and said circuit traces, wherein said housing further comprises at least one opening.

14. The battery operated temperature warning device of claim 13, further comprising:

a cap, wherein said cap covers said at least one opening in the housing such that the cap allows the warning signal emitted from the electronic warning device to be detected by a user.

* * * * *